United States Patent [19]

Brice

[11] Patent Number: 4,663,895
[45] Date of Patent: May 12, 1987

[54] WORK STATION FOR INSTRUMENT CONTROL ROOM

[75] Inventor: Richard M. Brice, Marrietta, Ga.

[73] Assignee: DCA Incorporated, Warrington, Pa.

[21] Appl. No.: 568,989

[22] Filed: Jan. 9, 1984

[51] Int. Cl.⁴ .............................................. E04H 1/00
[52] U.S. Cl. ............................................ 52/33; 52/239;
52/221; 52/79.7; 108/59; 312/198; D14/104
[58] Field of Search ................. 52/33, 36, 239, 238.1,
52/241, 79.7, 221; D14/102, 104; 312/198, 209;
108/59, 64

[56] References Cited

U.S. PATENT DOCUMENTS

| | | | |
|---|---|---|---|
| D. 250,953 | 1/1979 | Knodt et al. | D14/102 |
| D. 264,466 | 5/1982 | Davis et al. | D14/104 |
| 3,001,844 | 9/1961 | Spring | 108/64 |
| 4,012,088 | 3/1977 | Platz | 312/198 |
| 4,066,305 | 1/1978 | Gazarek | 312/195 |
| 4,113,331 | 9/1978 | Derdzinski | 312/198 |
| 4,372,087 | 2/1983 | Kump | 52/221 X |

FOREIGN PATENT DOCUMENTS 1352146  1/1964  France ................. 312/198

Primary Examiner—John E. Murtagh
Assistant Examiner—Caroline Dennison
Attorney, Agent, or Firm—Seidel, Gonda, Goldhammer & Abbott

[57] ABSTRACT

A work station for use in a control room wherein operators monitor instruments includes a platform supporting at least two upright perimeter walls spaced apart to provide at least two entrances onto the platform. Horizontally disposed desk tops are supported by the perimeter walls and on which are mounted instruments for observation by operators.

11 Claims, 7 Drawing Figures

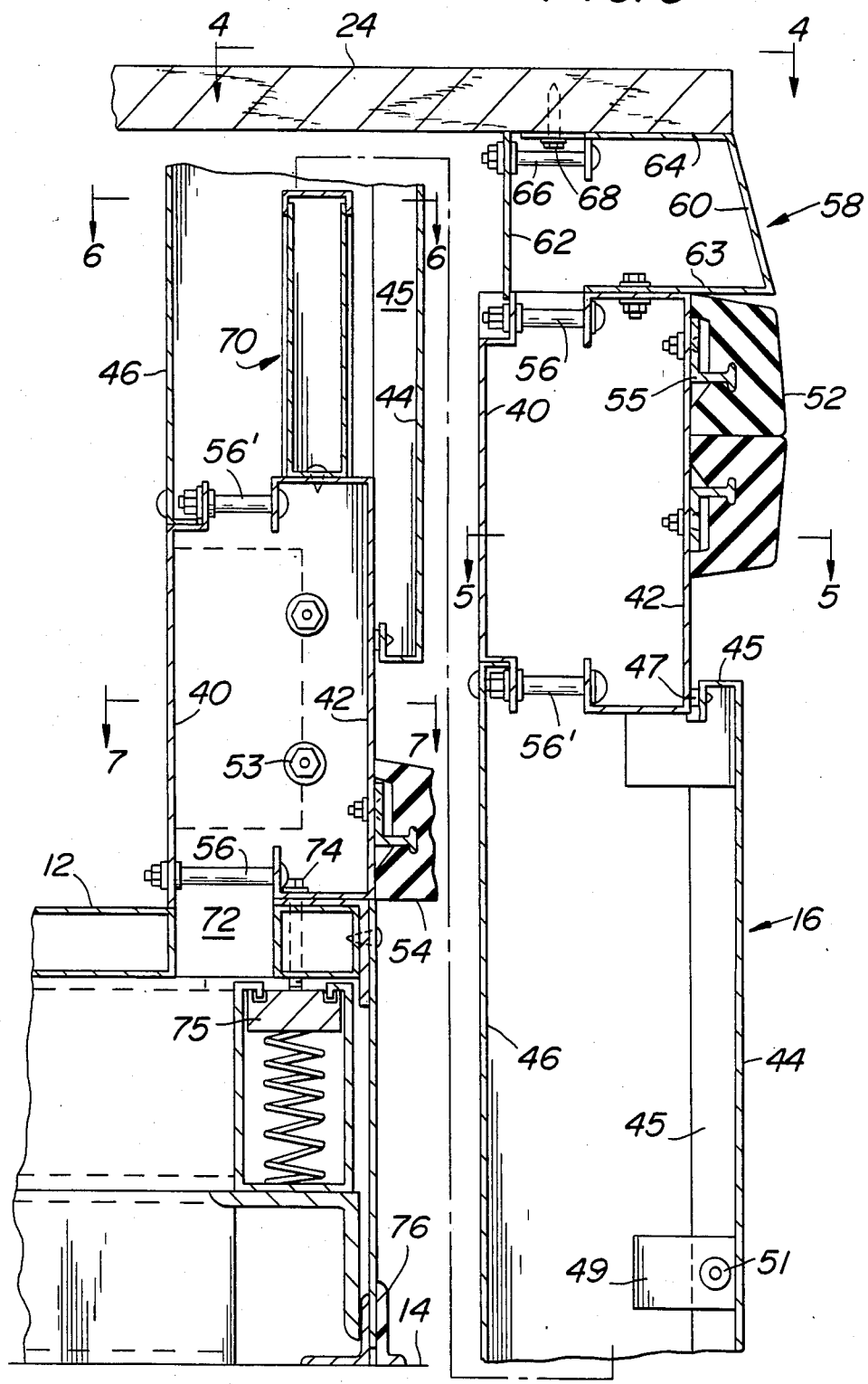

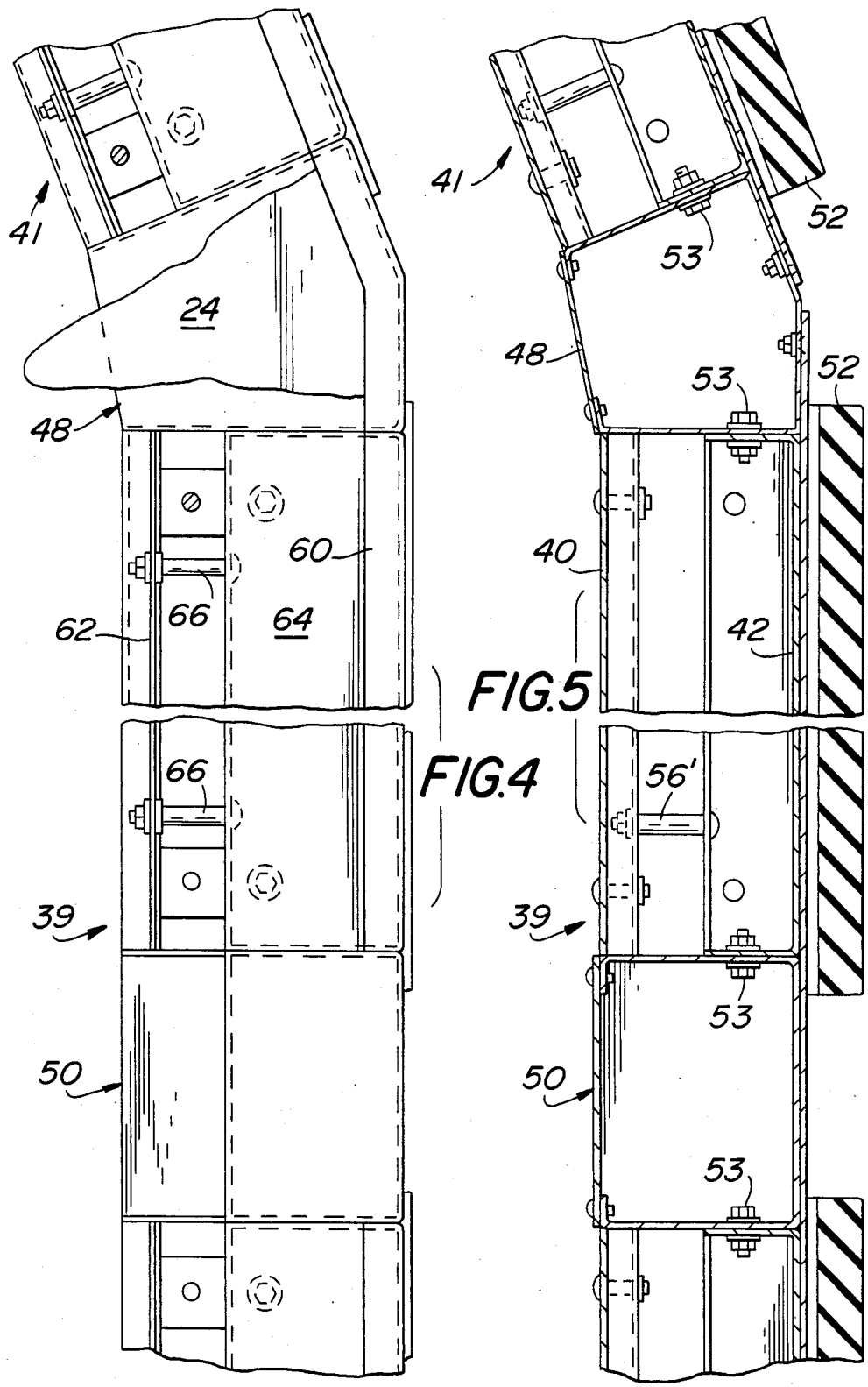

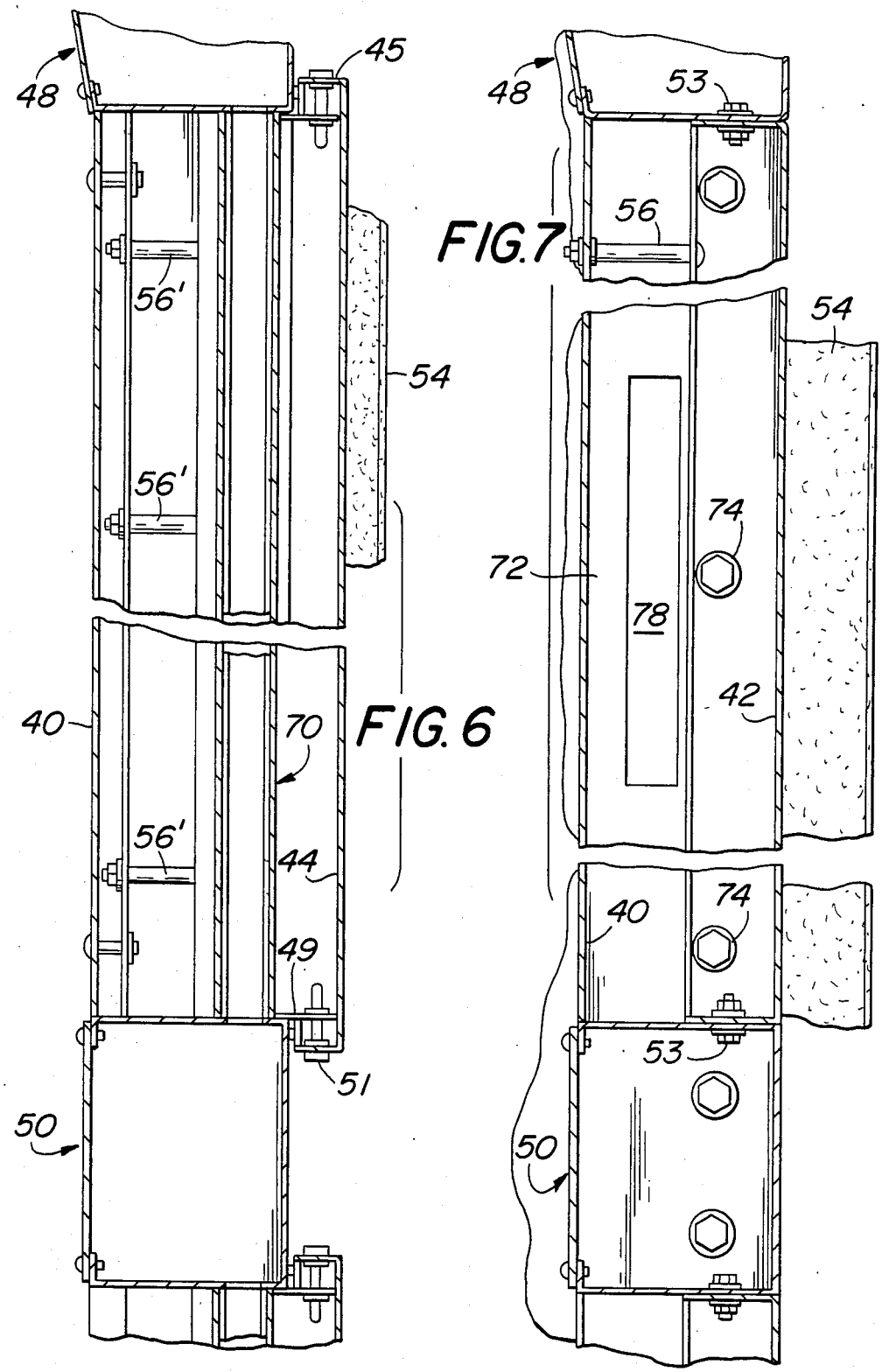

WORK STATION FOR INSTRUMENT CONTROL ROOM

BACKGROUND OF THE INVENTION

Instrument control rooms are provided in a variety of different facilities such as nuclear power stations, oil refineries, electric or fossil fuel generating plants, etc. In such control rooms, instruments are mounted on the walls and must be monitored by operators sitting at a work station.

The present invention is directed to solution of the problem of how to design an operator work station for an instrument control room in a manner so that the work station is aesthetically attractive, provides for ease of wiring with ease of access to wiring after installation, and having design versatility which permits ease of future modifications.

SUMMARY OF THE INVENTION

The present invention is directed to a work station for use in a control room wherein operators monitor instruments on a control panel. The work station includes a platform adapted to be mounted on a floor. At least two upright perimeter walls are supported by the platform and spaced apart at their ends to provide at least two entrances onto the platform. Horizontally disposed surfaces and instrument supports are coupled to the upper end of said perimeter walls. The perimeter walls are hollow so as to have inner and outer surfaces. The walls are made from discrete sections of sheet metal members and posts. A wire way is provided in said walls. Each of said surfaces have a plurality of removable panels to facilitate access to said wire way.

Various objects and advantages of the present invention will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view through a perimeter wall and taken along the line 3—3 in FIG. 2.

FIG. 4 is a view taken along the line 4—4 in FIG. 3.

FIG. 5 is a sectional view taken along a the line 5—5 in FIG. 3.

FIG. 6 is a sectional view taken along the line 6—6 in FIG. 3.

FIG. 7 is a sectional view taken along the line 7—7 in FIG. 3.

DETAILED DESCRIPTION

Figure 1:
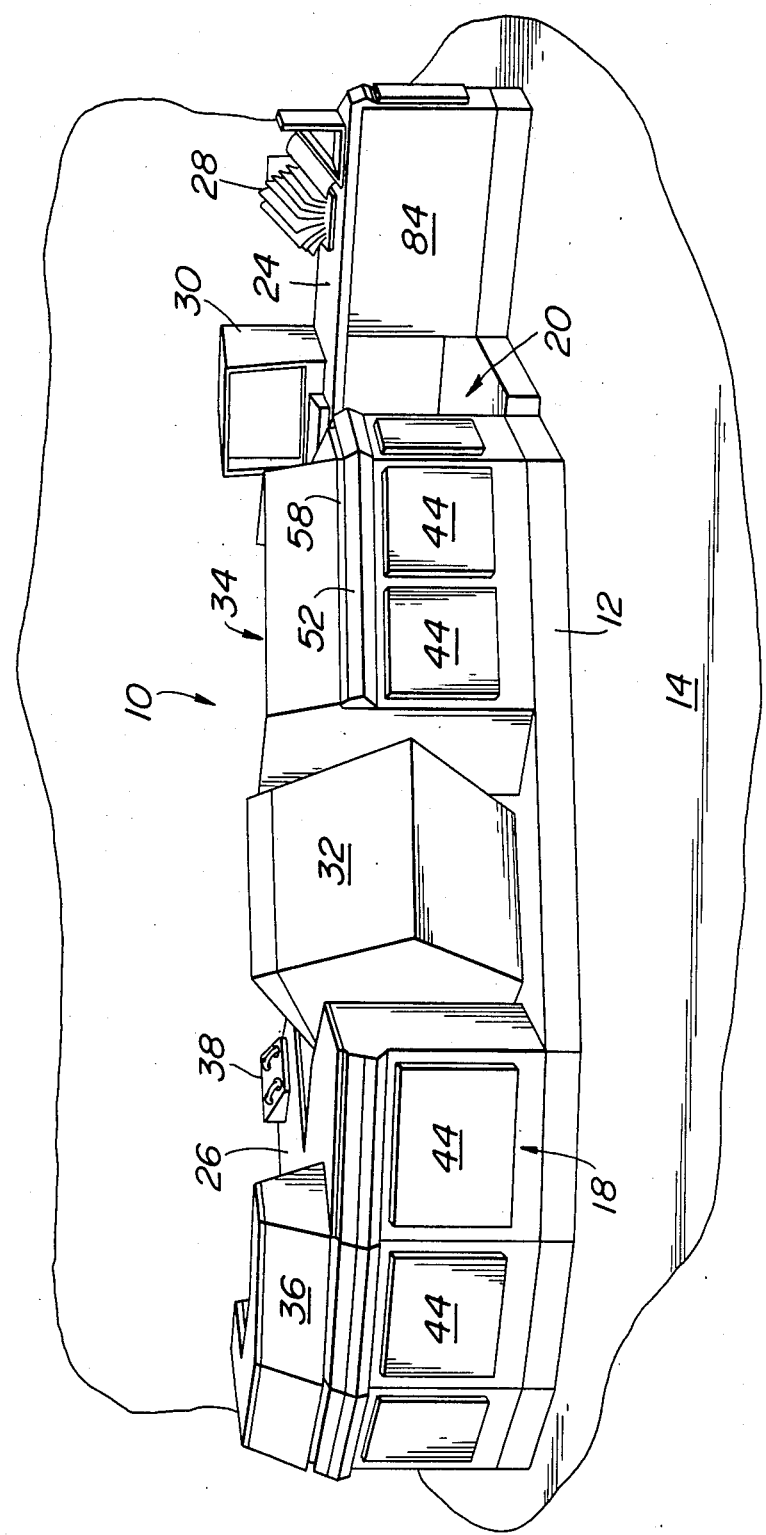
FIG. 1 is a perspective view of a work station in accordance with the present invention.

Referring to the drawing in detail, wherein like numerals indicate like elements, there is shown in FIG. 1 a work station in accordance with the present invention designated generally as 10. The work station includes a platform 12 mounted on a floor 14 to thereby delineate the work station to a specific area on a floor adjacent walls containing instruments. There are several psychological and practical aspects of having the work station mounted on a platform. For example, a work station of the type involved herein should only be occupied by authorized personnel and the use of a platform delineates and emphasizes the restricted area with respect to floor 14.

On the platform 12, there is attached at least two perimeter walls designated 16 and 18 having their ends spaced apart so as to define at least two entrances 20, 22 onto platform 12. A horizontally disposed desk top 24 is provided at the upper end of perimeter wall 16 and a comparable desk top 26 is associated with and supported by the perimeter wall 18. The desk tops 24, 26 are preferably a standard height above the platform 12 such as 72 cm. As will be described hereinafter, the height of the desk tops may be varied.

The desk tops may be designated to accommodate a wide variety of instruments and other devices utilized in a instrument control room including a procedures rack 28, CRT 30, CRT 32, alarm typer 34, control consul 36, telephone 38, etc.

The perimeter walls 16 and 18 are identical modular walls except for length and peripheral contour. Each of the walls 16, 18 is comprised of a plurality of vertical posts and flat sheet metal members. The sheet metal members ae preferably 16 gauge cold rolled commercial quality sheet steel as specified by ASTM A568. The surface texture of the metal members is preferably baked enamel texture finished with colors as desired. Other surface textures are available such as a simulated wood grain finish.

Since the perimeter walls 16 and 18 are identical, only perimeter walls 16 will be described in detail. Wall 16 is defined by straight wall sections connected together such as wall sections 39 and 41. See FIG. 2. In FIG. 3 there is illustrated a cross section of the wall section 39.

As shown in FIG. 3, the perimeter wall 16 is hollow. The inner surface is defined by a substrate 40 spaced from an outer surface defined by substrate 42. Each of the inner and outer substrates have a large opening therein which is covered by a removable access panel. The access panels on the outer substrates are designated 44 and on the inner substrates are designated 46. Access panel 44 has a flange 45 on its peripheral edges. Each flange 45 has a hole adapted to be snapped onto a rubber tip 47 to thereby mount the panel. Side flanges on the access panel 44 have guide tabs 49 attached thereto by fasteners 51. See FIGS. 3 and 6. Adjacent wall sections are coupled together by vertically disposed posts. If two adjacent wall sections are aligned, they are connected together by a four-sided post 50. See FIGS. 4–7. If adjacent wall sections are angled with respect to one another as is the case with wall sections 39 and 41, they are coupled together by way of a post 48 having at least five sides. As shown, post 48 is an irregular pentagon. Flanges at the ends of the wall sections are joined to their associated posts by conventional fasteners 53.

One or more rubber bumpers may be attached to the peripheral walls 16 and 18. As shown in FIG. 3, bumpers 52 are attached to a channel member 55 on the outer substrate 42 adjacent the upper end thereof. A similar bumper 54 may be attached to the outer substrate 42 adjacent the lower end thereof. See FIGS. 3, 6 and 7. The bumpers are a safety precaution to prevent harm to an operator who accidently bumps against the work station and to prevent the work station from being damaged by wheeled vehicles traversing floor 14.

A plurality of fasteners 56 extend between peripheral flanges on the inner and outer substrates 40, 42 to thereby interconnect the substrates. Around the access openings, the substrates 40, 42 have inwardly extending flanges which are coupled together by fasteners 56'.

The height of the desk top 24 may be selectively varied by using one or more spacers 58. See FIG. 3. Spacer 58 has an outer substrate 60 which includes an angled surface, a bottom wall 63 fastened to the top flange on substrate 42, and a top wall 64. Top wall 64 is fastened to the inner substrate 62 by fastener 66. A fastener 68 joins the top wall 64 to the desk top 24. Access to fastener 68 is attained by removing inner substrate 62.

Figure 2:
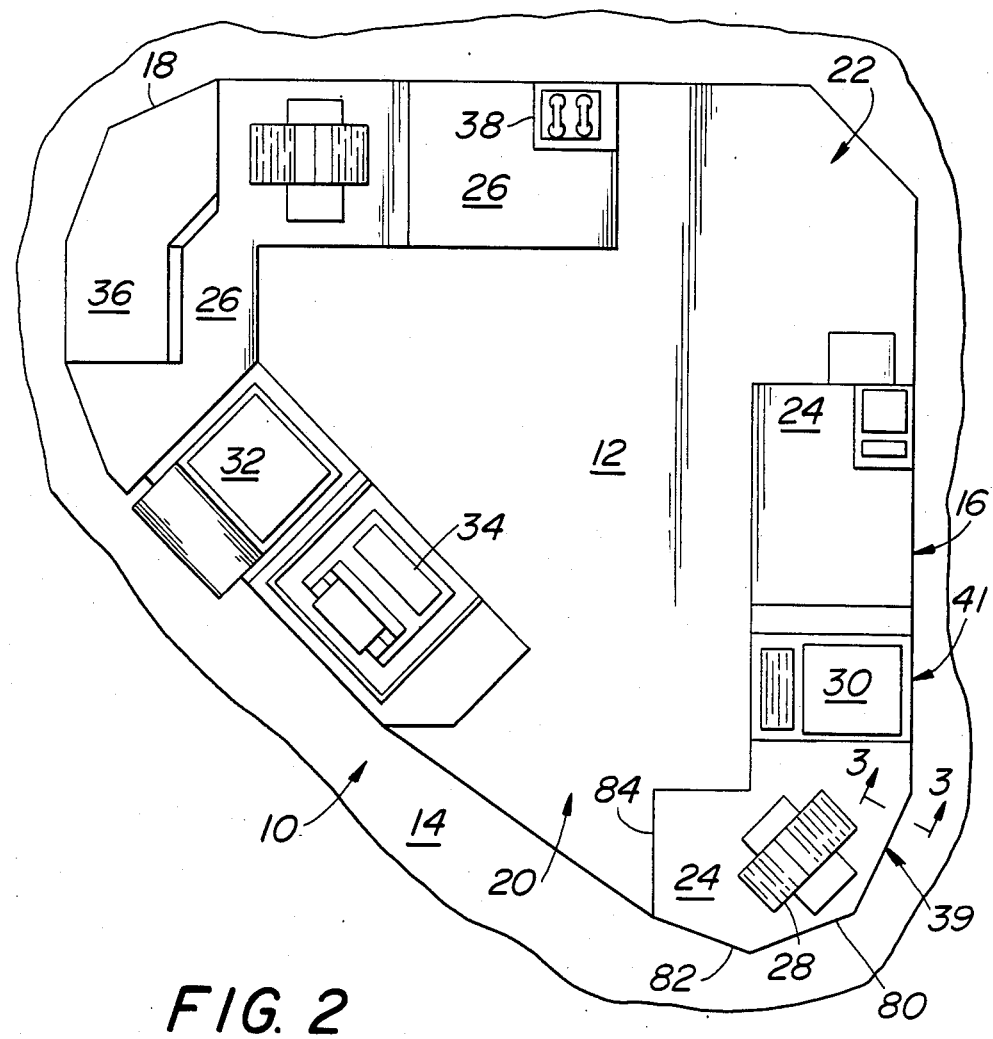
FIG. 2 is a top plan view of the present invention.

As shown more clearly in FIG. 2 and, FIG. 6, a wireway 70 extends horizontally along each of the wall sections of the perimeter walls 16, 18. Wireway 70 is a generally U-shaped channel fastened to a horizontally disposed flange on the outer substrate 42 at the elevation of the access panels 44, 46. Each of the posts has a channel shaped opening at the same elevation as wire way 70 so that wires may traverse the entire length of the perimeter walls. The wireway is preferably slotted along its length or provided with knockout holes along its length to facilitate exit of wiring coupled to the various instruments at the work station. An opening 72 is provided along the length of the wall sections at the bottom thereof to facilitate introduction of wiring into the wall section at any location therealong.

The lower end of the wall sections is joined to the platform 12 by fasteners 74 which extend through a horizontally disposed flange on the outer substrate 42 and into a spring-biased member 75 supported by platform 12. Molding 76 may be provided around the periphery of the perimeter walls at the floor 14. See the lower end of FIG. 3. As shown in FIG. 7, the floor 14 may be provided with a slot 78 which is aligned with the opening 72 so that wiring may be introduced into the perimeter wall sections from underneath the floor 14.

Referring to FIG. 2, it will be noted that each of the wall sections 41, 39, 80, 82 and 84 forming the perimeter wall 16 is a straight section and each of said wall sections is connected to a pentagon-shaped post like post 48. The included angles between those sections are obtuse angles whereby the perimeter walls 16 and 18 may traverse an arc without using curved panels. The smallest obtuse angle of 120° is between wall sections 82 and 84. The largest obtuse angle of 157.5° is between wall sections 39 and 41.

Thus, the work station 10 is comprised of a plurality of flat sections of different length and vertical posts with the option at any desired location of having a spacer 58 to change the elevation of the work station. For example, walls 16, 18 have been constructed using wall sections having lengths of 86.36 cm and 53.97 cm. The perimeter walls 16 and 18 may be disassembled at any time without destroying any components thereof for movement or for purposes of a design change.

While the perimeter walls are comprised of flat panels and posts, without using any curved panels, it will be noted that there are no right angle turns on the peripheral walls. As a result thereof, the work station uses minimum floor space with easy access onto the platform 12 by way of entrances 20, 22 which are generally opposite one another. The height of the work station above the level of floor 14 provides for improved observation of the instruments on the walls of the room by an operator sitting on a chair within the work station.

The present invention may be embodied in other specific forms without departing from the spirit or essential attributes thereof and, accordingly, reference should be made to the appended claims, rather than to the foregoing specification, as indicating the scope of the invention.

I claim:

1. A work station for use in a control room wherein operators monitor instruments on a control panel comprising a platform adapted to be supported by a floor, at least two upright perimeter walls on the platform perimeter and spaced apart at the ends to provide at least two entrances onto the platform, horizontally disposed surfaces and instrument supports disposed above and coupled to the upper end of said perimeter walls and extending inwardly therefrom, each of said perimeter walls being comprised of spaced apart inner and outer substrates and made from sheet metal, posts interconnecting adjacent substrates, a channel shaped wireway disposed between and extending substantially parallel to said inner and outer substrates and supported on a portion of at least one of said substrates, a plurality of panels removably coupled to said substrates so as to facilitate access to said wireway, and a bumper attached to the outer peripheral surface of one of the substrates comprising said perimeter walls.

2. A work station for use in a control room wherein operators monitor instrument on a control panel comprising a platform adapted to be supported by a floor, at least two upright perimeter walls on the platform perimeter and spaced apart at the ends to provide at least two entrances onto the platform, horizontally disposed surfaces and instrument supports disposed above and coupled to the upper end of said perimeter walls and extending inwardly therefrom, each of said perimeter walls being comprised of spaced apart inner and outer substrates and made from sheet metal, posts interconnecting adjacent substrates, a channel shaped wireway disposed between and extending substantially parallel to said inner and outer substrates and supported on a portion of at least one of said substrates, a plurality of access panels removably coupled to said substrates so as to facilitate access to said wireway, said inner and outer substrates having inwardly extending flanges removably connected to each other adjacent openings which said access panels overlie.

3. A work station in accordance with claims 1 or 2 wherein said substrates are flat and have inturned flanges for securement along vertical edges to adjacent posts.

4. A work station in accordance with claims 1 or 2 wherein each perimeter wall has four straight wall sections connected sequentially to each other via vertical posts with the included angle between each of the adjacent wall sections being an obtuse angle.

5. A work station in accordance with claims 1 or 2 wherein some of said posts are rectangular in section and other of said posts being an irregular pentagon in section.

6. A work station in accordance with claims 1 or 2 wherein said access panels are opposite one another at the elevation of said wire way.

7. A work station in accordance with claims 1 or 2 including a spacer disposed above and attached to the upper end of at least a portion of said perimeter walls, at least a portion of said horizontally disposed surfaces being connected to said spacer.

8. A work station for use in a control room wherein operators monitor instruments on a control panel comprising at least two upright perimeter walls disposed along the work station perimeter and spaced apart at their ends to provide at least two entrances to the space encompassed by said walls, a horizontally disposed support disposed above and coupled to the upper end of each of said perimeter walls and extending inwardly therefrom, said perimeter walls being comprised of spaced apart inner and outer substrates connected together and made from sheet metal, vertical posts interconnecting adjacent substrates, said substrates having inturned flanges secured along vertical edges to adjacent posts, some of said posts being rectangular in section and other of said posts being an irregular pentagon in section.

9. A work station in accordance with claim 8 wherein each perimeter wall has four straight wall sections connected sequentially to each other via said vertical posts with the included angle between each of the adjacent wall sections being an obtuse angle.

10. A work station in accordance with claim 8 wherein said inner and outer substrates have inwardly extending flanges removably connected to each other adjacent openings therein, and removable access panels overlying each opening.

11. A work station in accordance with claim 8 including a hollow spacer disposed below and attached to a bottom surface of one of said horizontally disposed supports and disposed above and attached to the upper end of a portion of one of said perimeter walls.

* * * * *